(12) United States Patent
Yoon

(10) Patent No.: US 8,841,015 B2
(45) Date of Patent: Sep. 23, 2014

(54) BATTERY PACK

(75) Inventor: Ji-Hyoung Yoon, Yongin-si (KR)

(73) Assignees: Samsung SDI Co., Ltd., Yongin-si (KR); Robert Bosch GmbH, Stuttgart (DE)

( * ) Notice: Subject to any disclaimer, the term of this patent is extended or adjusted under 35 U.S.C. 154(b) by 1049 days.

(21) Appl. No.: 12/878,921

(22) Filed: Sep. 9, 2010

(65) Prior Publication Data

US 2011/0287285 A1    Nov. 24, 2011

(30) Foreign Application Priority Data

May 24, 2010 (KR) ........................ 10-2010-0048185

(51) Int. Cl.
| | | |
|---|---|---|
| *H01M 10/50* | (2006.01) | |
| *H01M 10/647* | (2014.01) | |
| *B60L 11/00* | (2006.01) | |
| *B60L 11/18* | (2006.01) | |
| *H01M 10/625* | (2014.01) | |
| *B60L 1/00* | (2006.01) | |
| *B60L 3/00* | (2006.01) | |
| *H01M 10/6551* | (2014.01) | |
| *H01M 10/6572* | (2014.01) | |

(52) U.S. Cl.
CPC ...... *H01M 10/5016* (2013.01); *H01M 10/5032* (2013.01); *Y02E 60/12* (2013.01); *Y02T 10/7022* (2013.01); *B60L 11/005* (2013.01); *B60L 11/1879* (2013.01); *B60L 11/1874* (2013.01); *B60L 1/003* (2013.01); *B60L 2200/12* (2013.01); *B60L 3/0046* (2013.01); *H01M 10/5046* (2013.01); *Y02T 10/705* (2013.01); *H01M 10/5085* (2013.01); *Y02T 10/7005* (2013.01)

USPC .......................................................... 429/120

(58) Field of Classification Search
CPC .......... B60L 11/1874; H01M 10/5016; H01M 10/5032; H01M 10/5004; H01M 10/5046; H01M 10/5085; Y02E 60/12; Y02E 10/7005
USPC ............................................. 429/120, 61, 62
IPC ..................................................... H01M 10/50
See application file for complete search history.

(56) References Cited

U.S. PATENT DOCUMENTS

| | | | | |
|---|---|---|---|---|
| 4,314,008 | A | * | 2/1982 | Blake ................................. 429/8 |
| 6,403,876 | B1 | * | 6/2002 | Ghoshal et al. ................ 136/205 |
| 2006/0216582 | A1 | | 9/2006 | Lee et al. |
| 2006/0216583 | A1 | * | 9/2006 | Lee et al. ....................... 429/120 |

FOREIGN PATENT DOCUMENTS

| | | | |
|---|---|---|---|
| JP | 2008-047371 | | 2/2008 |
| JP | 2008047371 | A  * | 2/2008 |

(Continued)

OTHER PUBLICATIONS

Machine English Translation of JP 2010-113861 A, 19 pages.

(Continued)

*Primary Examiner* — Basia Ridley
*Assistant Examiner* — Heng Chan
(74) *Attorney, Agent, or Firm* — Christie, Parker & Hale, LLP

(57) ABSTRACT

A battery pack includes at least one battery module comprising a plurality of unit cells stacked together; and at least one thermoelectric module on the at least one battery module, wherein the thermoelectric module may include a Peltier device having an input terminal configured to receive a polarity-convertible current.

14 Claims, 9 Drawing Sheets

(56) References Cited

FOREIGN PATENT DOCUMENTS

| | | |
|---|---|---|
| JP | 2010-113861 A | 5/2010 |
| KR | 1019980048436 A | 9/1998 |
| KR | 10-2004-0049208 A | 6/2004 |
| KR | 10-2007-0121089 A | 12/2007 |
| KR | 10-2009-0097989 A | 9/2009 |

OTHER PUBLICATIONS

Patent Abstracts of Japan, and English machine translation of Japanese Publication 2008-047371, listed above, 74 pages.

* cited by examiner

BATTERY PACK

CROSS-REFERENCE TO RELATED PATENT APPLICATION

This application claims priority to and the benefit of Korean Patent Application No. 10-2010-0048185, filed on May 24, 2010, in the Korean Intellectual Property Office, the disclosure of which is incorporated herein in its entirety by reference.

BACKGROUND

1. Field

The present invention relates to battery packs including secondary batteries used in electric cars or electric bicycles.

2. Description of the Related Art

Secondary batteries refer to batteries that may be rechargeable. The secondary batteries are the primary components for providing power to portable electronic appliances such as cellular phones, laptop computers, or camcorders. Also, secondary batteries are used as primary components for providing power to environment-friendly transportation devices such as electric cars or electric bicycles.

Unit cells of the secondary battery include an electrode assembly and an electrolyte. The electrode assembly includes a positive electrode plate, a negative electrode plate, and a separator therebetween. The electrolyte is filled between the positive electrode plate and the negative electrode plate of the electrode assembly. Lithium ions contained in the electrolyte pass through the separator and move between the positive electrode plate and the negative electrode plate to thereby cause charging or discharging. During charging, electric energy is converted to chemical energy, and during discharging, chemical energy is converted to electric energy. During the energy conversion, heat is generated in the unit cells due to, for example, collision of lithium ions.

For high power output and large capacity of an electric bicycle or an electric car, a plurality of unit cells of secondary batteries may be stacked horizontally and/or vertically.

In a battery module, heat may be generated in the unit cells during charging and discharging and also due to changes in the external environment or due to external impact.

If the heat is not efficiently discharged from each of the unit cells, the unit cells may be over-heated and thus the charging or discharging performance may be degraded, and at worst, the battery module may explode. Meanwhile, if the ambient temperature of the battery module is low, the output power may be low.

SUMMARY

One or more embodiments of the present invention provide battery packs with increased stability and power output characteristics by maintaining an appropriate temperature around unit cells of the battery packs.

According to an aspect of the present invention, a battery pack includes at least one battery module comprising a plurality of unit cells stacked together; and at least one thermoelectric module on the at least one battery module. In one embodiment, the at least one thermoelectric module includes a Peltier device comprising an input terminal configured to receive a polarity-convertible current.

The battery pack may also include a battery management system having a switching device configured to convert a polarity of a current applied to an electrode of the Peltier device and a temperature sensor, wherein the at least one thermoelectric module is configured to convert a polarity of a current applied to an electrode of the Peltier device based on a temperature measured by the temperature sensor.

In one embodiment, the battery pack includes a plurality of thermoelectric modules, wherein each of the thermoelectric modules is configured to operate independently. Further, each of the thermoelectric modules may include at least one thermoelectric device including a positive input terminal and a negative input terminal, a first heat transfer member contacting a first surface of the at least one thermoelectric device, and a second heat transfer member contacting a second surface of the at least one thermoelectric device. In one embodiment, a first thermoelectric module is located on a first end of the unit cells and a second thermoelectric module is located on a second end of the unit cells to fix the unit cells together.

Further, in one embodiment, the battery pack includes a plurality of heat pipes on the battery module and contacting the first heat transfer member and the battery module, wherein the heat pipes are accommodated in grooves on the first heat transfer member. The heat pipes may extend along the battery module in a first direction and in a second direction substantially perpendicular to the first direction. Additionally, the battery pack may be configured to power an electric bicycle.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION

Embodiments of the present invention will now be described more fully with reference to the accompanying drawings, in which exemplary embodiments of the invention are shown.

Figure 1:
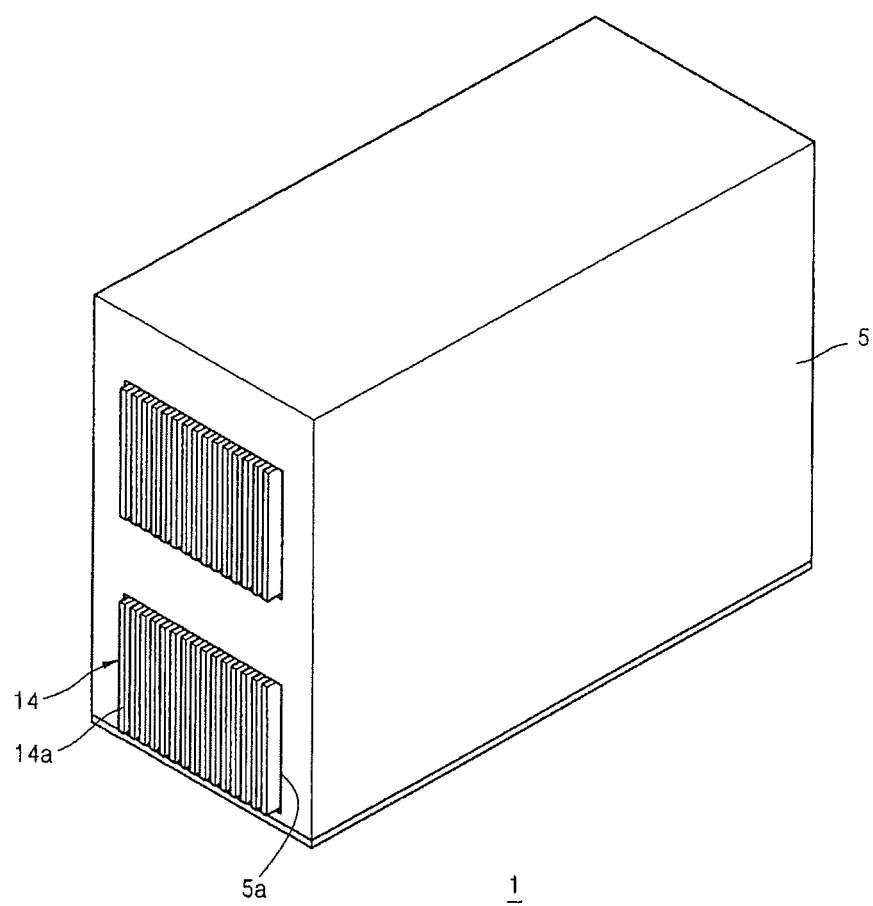
FIG. 1 is a perspective view illustrating a battery pack according to an embodiment of the present invention.

FIG. 1 is a perspective view illustrating a battery pack 1 according to an embodiment of the present invention. The battery pack is surrounded by or substantially encompassed by a housing 5. For example, at least two battery modules 11 may be mounted in the battery pack 1 and then substantially covered by the housing 5. Descriptions hereon will describe one battery module 11 but it will be understood that all of the battery modules 11 can be substantially similar. A plurality of unit cells of the battery module 11 are stacked in a first direction. In addition, a heat sink 14 may protrude from each of two lateral sides of the battery module 11 in the first direction. When the battery pack 1 is installed in an electric bicycle, the heat sink 14 may be directly exposed to outside air and thus if cold air passes around the heat sink 14, the battery pack 1 is cooled efficiently.

In one embodiment, an extension direction of heat dissipation pins 14a of the heat sink 14 may vary according to a position and/or an orientation of the battery pack 1 of an electric product, for example, an electric bicycle. For example, the extension direction of the heat dissipation pins 14a may be set as close as possible to the direction in which outside air may pass through the battery pack 1. Thus, when the electric bicycle is moving forward, air may actively dissipate heat and thus may effectively cool the battery pack 1.

Further, if the battery pack 1 is attached in such a way that it is not directly exposed to outside air, the heat sink 14 may be oriented in such a way that it does not protrude outside of the housing 5. In this case, a heat dissipation fan can be additionally attached to the heat sink 14, and outer air holes may be formed in a portion of the housing 5 to discharge warm air transferred by the heat dissipation fan.

Figure 2:
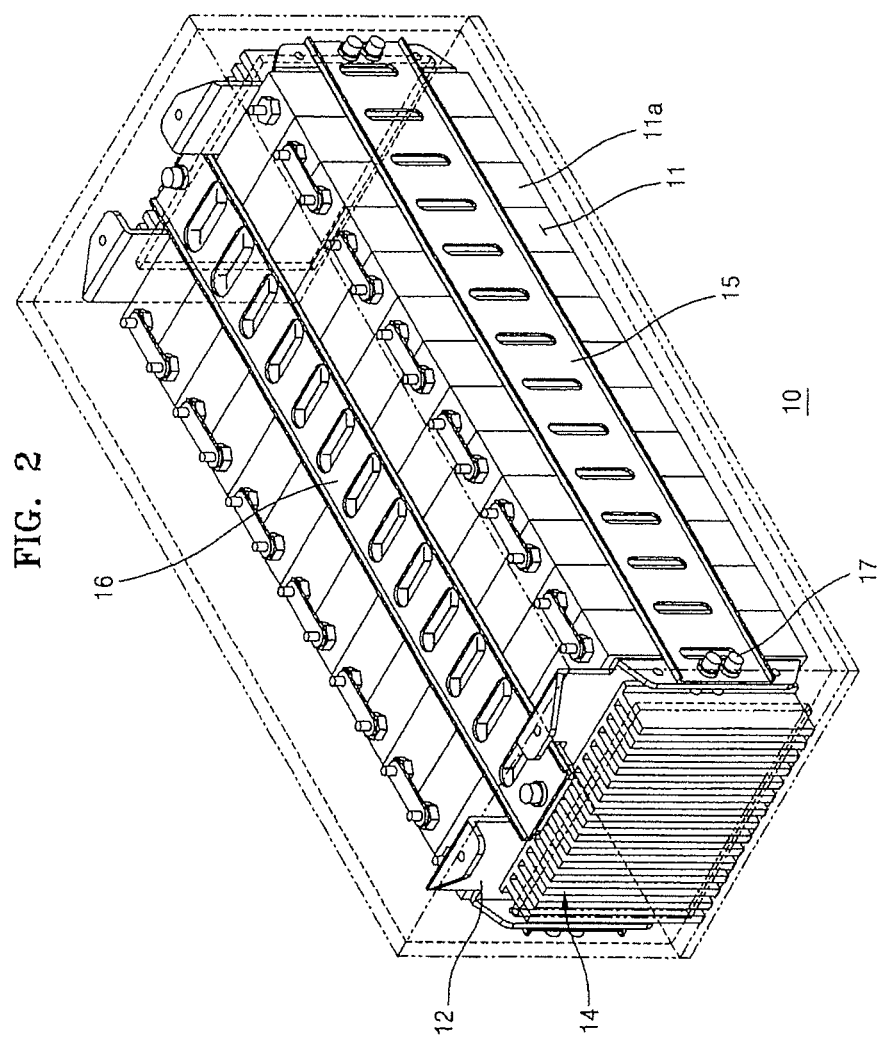
FIG. 2 is a perspective view of an interior of the battery pack of FIG. 1.

FIG. 2 is a perspective view illustrating the battery pack 1 of FIG. 1.

The battery module 11 includes a plurality of unit cells 11a stacked in the first direction, that is, a length direction. The unit cells 11a are electrically connected in series and/or parallel according to the purpose of the battery pack 1.

Thermoelectric modules 12, 13, and 14 (FIGS. 2 and 3) are located on each of the two lateral sides of the battery module 11 in the longitudinal direction. Hereinafter, the sides of the battery module 11 in the longitudinal direction (i.e., at each end of the battery module) will be referred as first side portions. The thermoelectric modules 12, 13, and 14 may be connected to a side plate 15 and an upper plate 16.

Accordingly, by compressing the stacked unit cells 11a between the thermoelectric modules 12, 13, and 14 on opposing first side portions, the stacked unit cells 11a may be fixed to each other. The thermoelectric modules 12, 13, and 14 on the opposing first side portions may be connected to each other by using the side plate 15 and/or the upper plate 16. That is, the thermoelectric modules 12, 13, and 14 may function as end plates.

In one embodiment, the thermoelectric modules 12, 13, and 14 may be located on only one of the sides of the battery module 11. Further, the thermoelectric modules 12, 13, and 14 may be connected only to the side plate 15, only to the upper plate 16 and/or also connected to a lower plate.

The thermoelectric modules 12, 13, and 14 according to an embodiment of the present invention will be described in detail with reference to FIG. 3.

In the current embodiment, the thermoelectric modules 12, 13, and 14 include a Peltier device 13, a first heat transfer member 12, and a second heat transfer member 14.

The first heat transfer member 12 is formed of a material having good heat conductivity. The first heat transfer member 12 has a flat surface in order for a first surface of the Peltier device 13 to be located thereon. The first heat transfer member 12 also includes a curved side portion 12a and an curved upper portion 12b that are respectively formed on a boundary of a side surface and a boundary of an upper surface of the first transfer member 12 and are each bent at substantially a right angle. A screw hole 12aa corresponding to a screw hole 15a formed in the side plate 15 may be formed in the curved side portion 12a. A screw hole 12ba corresponding to a screw hole 16a formed in the upper plate 16 may be formed in the curved upper portion 12b. Also, a curved portion 12c that supports another battery module 11 may be formed in an upper portion of the first heat transfer member 12 so that another battery module 11 may be mounted on the first heat transfer member 12.

The second heat transfer member 14 may be the heat sink 14 described above. An inner surface of the heat sink 14 is flat and contacts a second surface of the Peltier device 13, and the heat dissipation pins 14a may be thin and may be formed on an outer surface of the heat sink 14 to increase its surface area.

During assembly, the Peltier device 13 is inserted between the first heat transfer member 12 and the second heat transfer 14 to contact them both. Accordingly, the Peltier device 13 is in surface contact with the first heat transfer member 12 and the second heat transfer member 14, thereby forming a heat transfer path.

The thermoelectric modules 12, 13, and 14 are maintained in contact with the first side portions of the battery module 11 by being screw-coupled to the side plate 15 and the upper plate 16 via screws 17 and 18, respectively.

Figure 7:
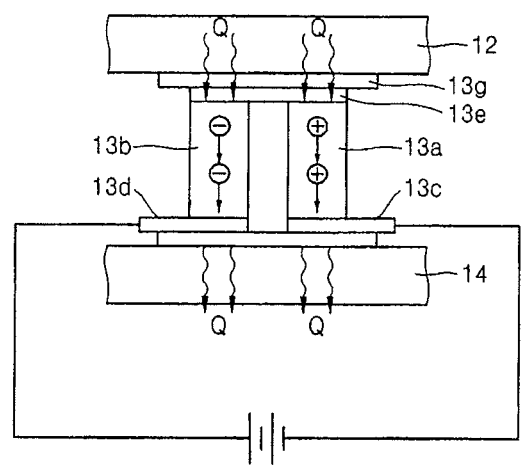
FIG. 7 is a schematic view illustrating an operational principle of a thermoelectric device according to an embodiment of the present invention.

The Peltier device 13 is operated according to the principle as shown in FIG. 7. The Peltier effect refers to a phenomenon where end portions of two different metals are bonded and a current is applied thereto, causing heat to be absorbed in one bonding portion, and heat to be generated by the other bonding portion. Metals 13d and 13c are respectively bonded to ends of an n-type semiconductor 13b and a p-type semiconductor 13a while having a metal 13e located between the n-type semiconductor 13b and the p-type semiconductor 13a, with a direct current circuit being connected to the metals 13d and 13c. Bonding portions serially formed between the metal 13e, the n-type semiconductor 13b, and the metal 13d may each be a Peltier device, and bonding portions serially formed between the metal 13e, the p-type semiconductor 13a, and the metal 13c may each be a Peltier device. All the elements together may form the Peltier device 13. A current may be applied to each bonding portion. When free electrons flow from the metal 13e to the n-type semiconductor 13b, electrons on the Fermi level need to transfer to a conduction band of the n-type semiconductor 13b and thus the average movement energy of the electrons in the bonding portion between the n-type semiconductor 13b and the metal 13e is increased to absorb heat from the surroundings. When free electrons flow from the semiconductor 13b to the metal 13d, the movement energy of the electrons is reduced and thus heat is dissipated to the surroundings, thereby generating heat. If a current is applied to the two metals 13d and 13c in opposite directions, heat generation and heat absorption occurs in the same direction.

Figure 8:
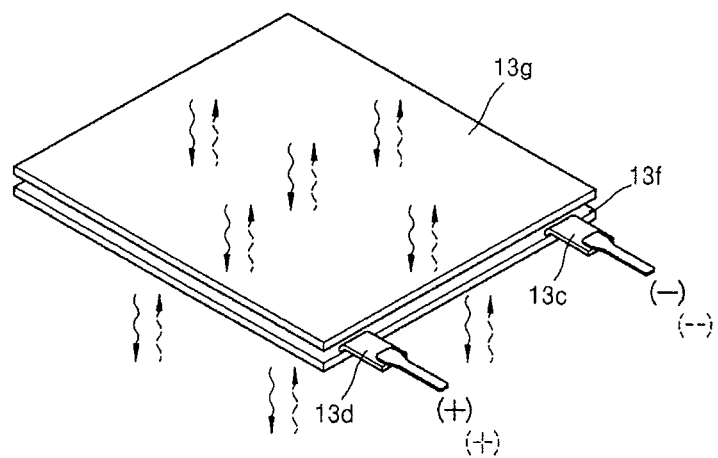
FIG. 8 is a perspective view illustrating a thermoelectric device according to an embodiment of the present invention.

That is, when a positive voltage and a negative voltage are applied to the metal 13d, that is, a left input terminal 13d, and the metal 13c, that is, a right input terminal 13c, heat is absorbed from an upper surface 13g and then the absorbed heat is dissipated onto a lower surface 13f as illustrated by solid arrows in FIG. 8. On the other hand, when a negative voltage and a positive voltage are respectively applied to the left input terminal 13d and the right input terminal 13c, heat is absorbed from the lower surface 13f and heat is dissipated onto the upper surface 13g as illustrated by dotted arrows in FIG. 8.

As described above, by converting a polarity of a current applied to the left and right input terminals 13d and 13c of the Peltier device 13, heat absorption or heat generation may be controlled to selectively occur using the same current. For example, referring to FIG. 3, when the battery module 11 is to be cooled, a polarity of current to be applied is adjusted to be such that heat absorption occurs on the first surface of the Peltier device 13 contacting the first heat transfer member 12, and heat is generated at the surface of the Peltier device 13 contacting the second heat transfer member 14. Accordingly, the heat generated in the battery module 11 is quickly and efficiently transferred to the heat sink 14 and discharged outside therethrough. On the other hand, if the battery module 11 is to be heated, a polarity of current to be applied is adjusted to be such that heat is generated at the surface of the Peltier device 13 contacting the first heat transfer member 12, and heat absorption occurs on the surface of the Peltier device 13 contacting the second heat transfer member 14. Accordingly, heat around the battery module 11 is taken and transferred to the battery module 11 to heat the battery module 11.

Figure 9:
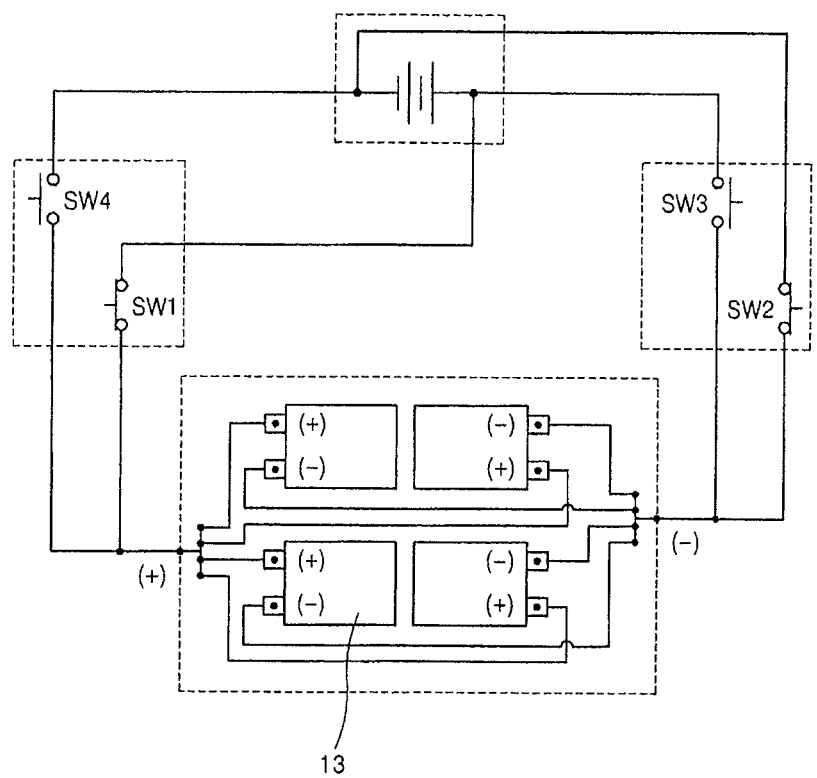
FIG. 9 is a circuit diagram illustrating a switching circuit of a battery management system that converts a polarity of a current applied to a thermoelectric module according to an embodiment of the present invention.

FIG. 9 is a circuit diagram illustrating a switching circuit of a battery management system that may convert a polarity of a current applied to a thermoelectric module. The battery management system may be installed inside the housing 5. Meanwhile, the thermoelectric module may be formed of one Peltier device 13, but may also be formed of a plurality of Peltier devices 13 as illustrated in FIG. 9.

Positive input terminals of the Peltier devices 13 may be connected to each other, and negative input terminals of the Peltier devices 13 may be connected to each other. When a third switch SW3 and a fourth switch SW4 are opened and a first switch SW1 and a second switch SW2 are shut, a positive voltage is applied to the positive (+) input terminal of the Peltier device 13, and a negative voltage is applied to the negative (−) input terminal of the Peltier device 13. On the other hand, when the first switch SW1 and the second switch SW2 are opened and the third switch SW3 and the fourth switch SW4 are shut, a negative voltage is applied to the positive (+) input terminal of the Peltier device 13, and a positive voltage is applied to the negative (−) input terminal of the Peltier device 13. Accordingly, in the above-described manner, the thermoelectric module may be controlled in such a way that heat generation and heat absorption selectively occur.

The switching circuit illustrated in FIG. 9 is exemplary and other equivalent electric circuits may also be formed, as is well known to one of ordinary skill in the art.

Figure 4:
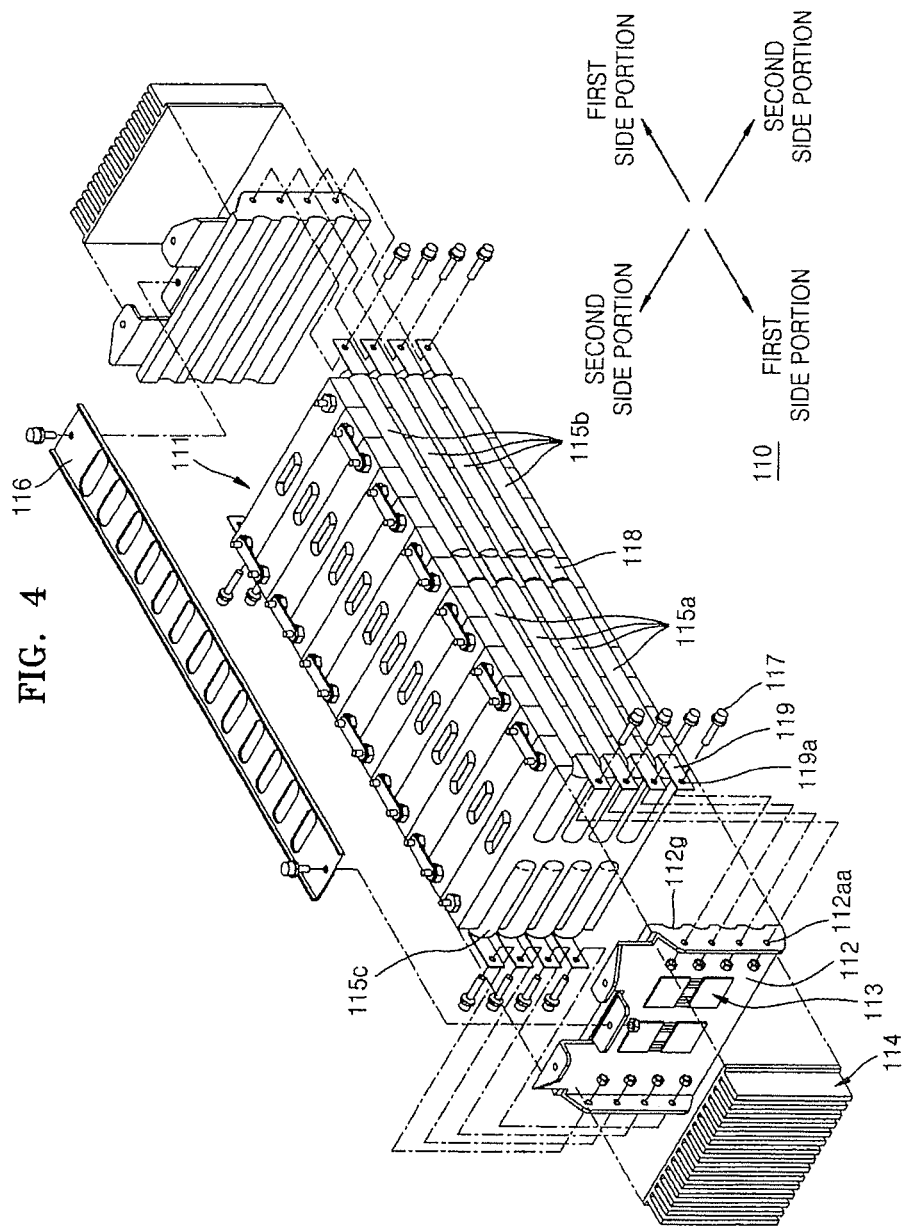
FIG. 4 is a partially exploded perspective view illustrating a battery pack according to another embodiment of the present invention.

FIG. 4 is a cut-away perspective view illustrating a battery pack 110 according to another embodiment of the present invention.

In the battery pack 110, heat pipes 115a, 115b, and 115c are further included as closed pipes. An operating fluid in the heat pipes 115a, 115b, and 115c is transferred from a high temperature portion to a low temperature portion through phase change cycles, and then to the high temperature portion again. The operational fluid in the heat pipes 115a, 115b, and 115c dissipates heat absorbed in the high temperature portion to the low temperature portion through the phase change cycles. The heat pipes 115a, 115b, and 115c have about 40 times higher efficiency than copper in terms of heat transfer.

The heat pipes 115a, 115b, and 115c may be, for example, vacuum-sealed containers having a porous wick installed on an inner wall thereof and have a small amount of liquid operating fluid saturated in the porous wick. A container evaporation unit in the heat pipes 115a, 115b, and 115c is a vapor path of the operating fluid. The heat pipes 115a, 115b, and 115c may be formed of three elements, for example, an evaporation unit, a condensation unit, and a heat insulation unit. When heat is applied to the evaporation unit, the heat is absorbed by the liquid and the heat is used as evaporation heat to evaporate the liquid into a vapor, and the vapor is transported to the condensation unit. In the condensation unit, heat is dissipated, and vapor is condensed into a condensate and then absorbed into the wick. The condensate may return to the evaporation unit due to a difference in capillary pressures formed at a gas-liquid interface of the wick between the condensation unit and evaporation unit. As the operating fluid goes through phase change cycles, heat may be transported from the evaporation unit to the condensation unit without requiring external power.

The heat pipes 115a, 115b, and 115c are located along a first side portion and a second side portion of a battery module 111. For example, the heat pipe 115 may be bent at substantially a right angle at a corner of the battery module 111 and thus a first end portion of the heat pipe 115a may be located on the first side portion of the battery module 111, and a second end portion of the heat pipe 115a may be located on the second side portion of the battery module 111. A plurality of the heat pipes 115a may be separately located along a height direction of the battery module 111. The heat pipes 115a, 115b, and 115c may be bent at each corner of the battery module 111.

In one embodiment, the heat pipes 115a and 115b located along the second side portion may be connected to each other via a connection member 118. Also, a coupling plate 119 may protrude from a curved portion of the heat pipes 115a toward thermoelectric modules 112, 113, and 114. A screw hole 119a formed in the coupling plate 119 and a screw hole 112aa that is formed in a curved side portion of the first heat transfer member 12 and corresponds to the screw hole 119a are aligned, and a screw 117 may be inserted into the screw holes 119 and 112aa and coupled thereto.

Accordingly, the thermoelectric modules 112, 113, and 114 may function as end plates, and the heat pipes 115a and 115b may function as side plates. Thus, the battery module 111 may be firmly fixed and closely adhered to a surface of the battery module 111, thereby facilitating heat transfer in the battery module 111.

The heat pipes 115a, 115b, and 115c may have a substantially circular inner cross-section. Alternatively, the heat pipes 115a, 115b, and 115c may instead have an ovular inner cross-section. The heat pipes 115a, 115b, and 115c having an ovular inner cross-section have a greater contact surface area for contacting a surface of the battery module 111 than the heat pipes 115a, 115b, and 115c having a circular inner cross-section, and thus may further improve heat transfer performance.

Also, grooves 112g having a shape corresponding to the cross-sections of the heat pipes 115a, 115b, and 115c may be formed on the surface of the first heat transfer member 12 contacting the battery module 111. Accordingly, the contact surface between the heat pipes 115a, 115b, and 115c and the first heat transfer member 12 is maximized, thereby further promoting heat transfer.

Figure 10:
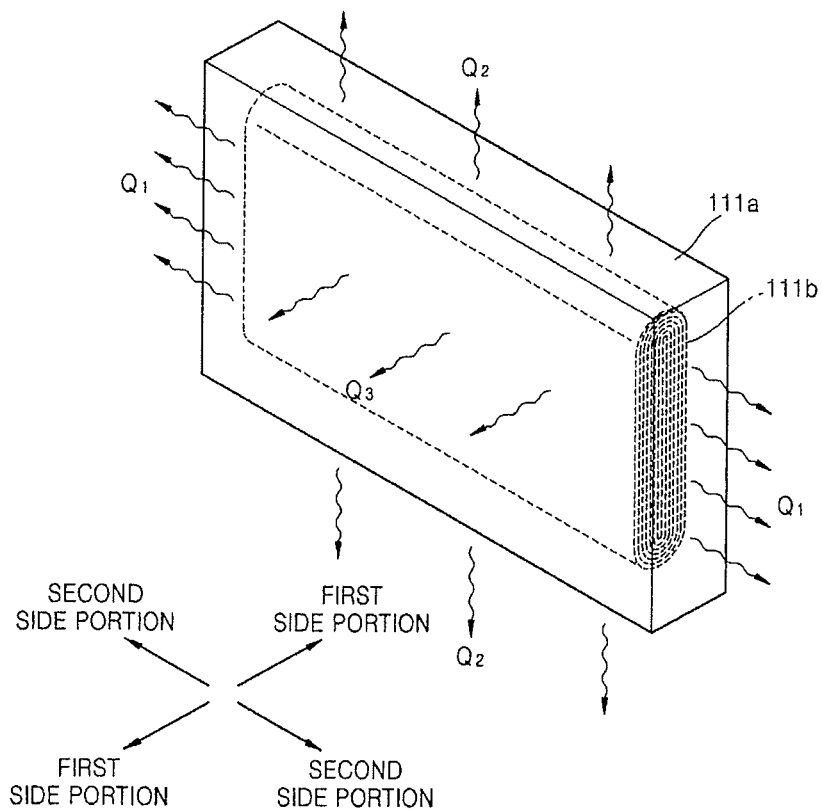
FIG. 10 illustrates a direction in which heat is discharged in a unit cell including an electrode assembly according to an embodiment of the present invention.

While varying according to the type of the battery module 111, usually more heat is generated in the second side portion than the first side portion of the battery module 111 because, as illustrated in FIG. 10, opened upper and lower portions of an electrode assembly 111b mounted in each unit cell 111a are directed toward the second portion of the unit cells 111a. That is, heat generated in the electrode assembly 111a is easily transferred to the opened upper and lower portions of the electrode assembly 111*b*, and thus an amount of heat Q1 that comes out to the second side portion of the unit cell 111*b* may be the greatest.

Consequently, the second side portion of the battery module 111 illustrated in FIG. 4 is warmer than the first side portion thereof. Furthermore, heat absorption by the thermoelectric modules 112, 113, and 114 occurs on the first side portion of the battery module 111, and thus a difference in temperatures of the first side portion and the second side portion of the battery module 111 increases.

Thus, the heat pipes 115*a* may quickly transfer the heat generated in the second side portion, which is a high temperature area of the battery module 111, to the first side portion, which is a low temperature area of the battery module 111, and thus the heat may be efficiently discharged out of the first side portion through the thermoelectric modules 112, 113, and 114. Thus, the battery module 111 may be efficiently and easily cooled.

Figure 5:
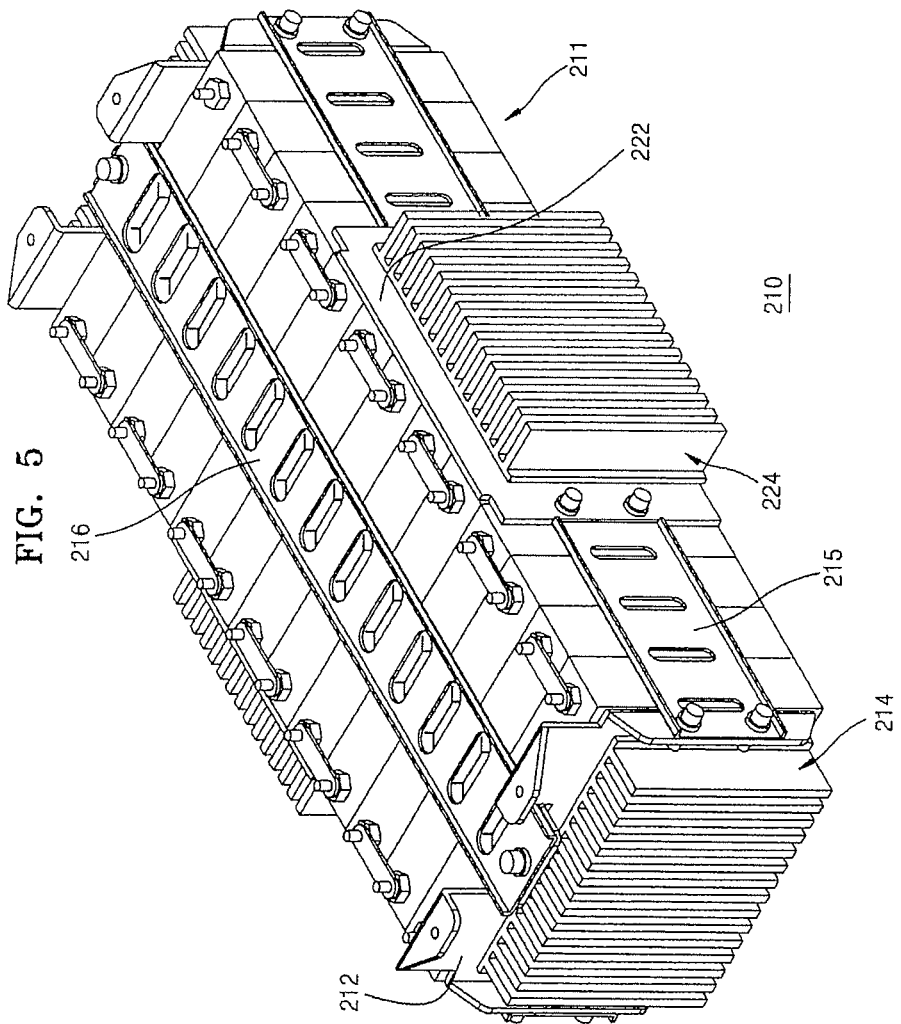
FIG. 5 is a cut-away perspective view illustrating a battery pack according to still another embodiment of the present invention.

FIG. 5 is a cut-away perspective view illustrating a battery pack 210 according to another embodiment of the present invention.

Figure 3:
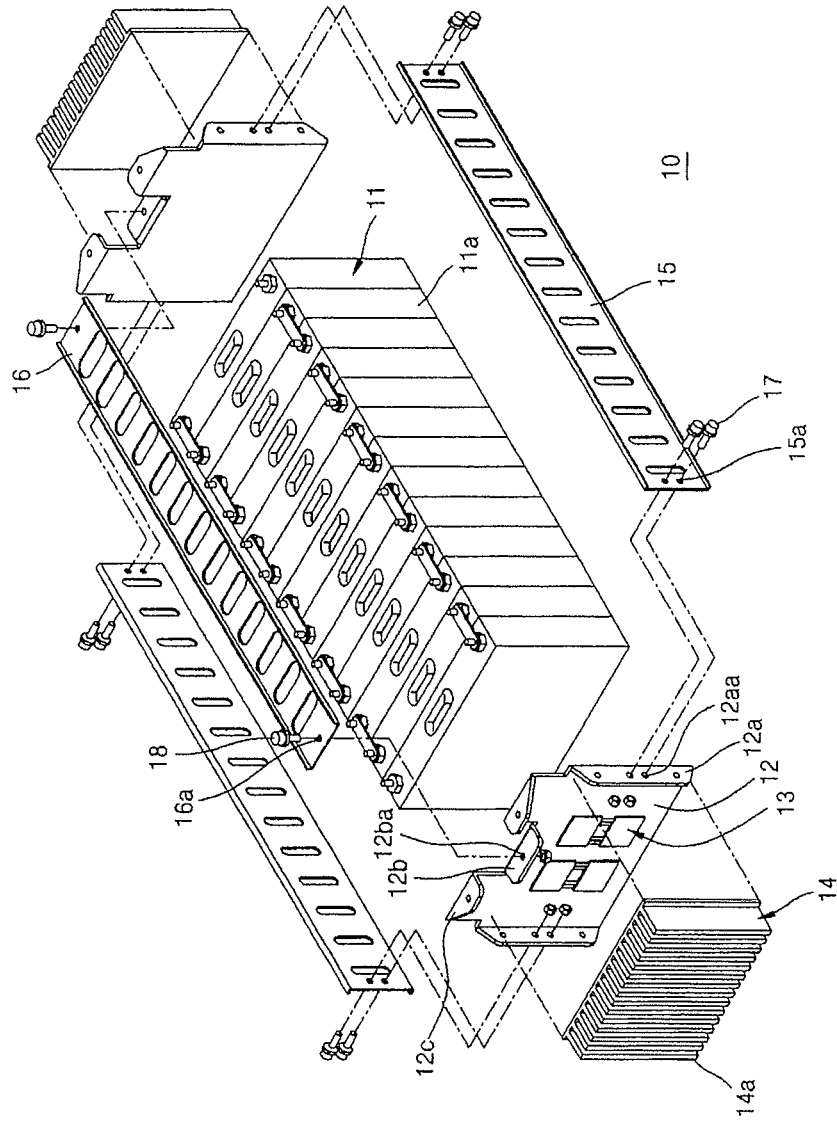
FIG. 3 is a partially exploded perspective view illustrating the battery pack of FIG. 1.

The battery pack 210 is different from the battery pack 10 of FIG. 3 in that thermoelectric modules 222 and 224 are further disposed on a second side portion of a battery module 211. A first heat transfer member 212 located on the second side portion may be coupled to a side plate 215, for example, by screw-coupling.

As described above, the second side portion of the battery module 211 usually generates more heat than a first side portion thereof. Thus, by locating the thermoelectric modules 222 and 224 on the second side portion, heat dissipation may quickly occur in the entire battery module 211.

Likewise, if the ambient temperature of the battery module 211 is low and is to be increased, and if heat that is generated in the thermoelectric modules 212, 214, 222, and 224 and transferred to an electrode assembly in the battery module 211 is provided to the second side portion, the heat is more effectively transferred to the electrode assembly. Accordingly, the temperature of the battery module 211 may also be quickly increased.

In one embodiment, when the thermoelectric modules 212, 214, 222, and 224 are located not only along the first side portion but also the second side portion of the battery module 211, the thermoelectric modules 212, 214, 222, and 224 may be independently cooled or heated. An optimum temperature is thereby distributed over the entire battery module 211, thus improving the performance of the battery pack 210. To this end, the thermoelectric modules 212, 214, 222, and 224 each include a temperature sensor and operate based on a measured temperature value.

Figure 6:
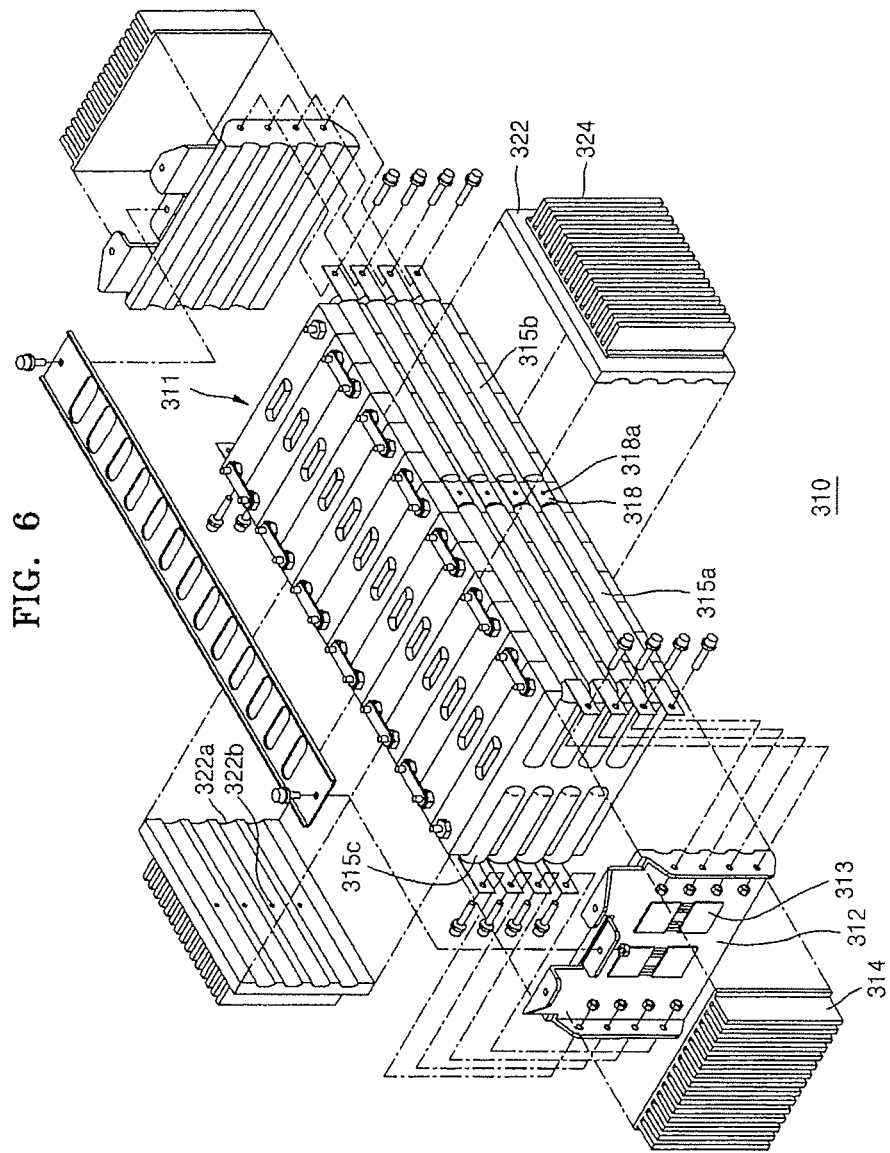
FIG. 6 is a partially exploded perspective view illustrating a battery pack according to another embodiment of the present invention.

FIG. 6 is a cut-away perspective view illustrating a battery pack 310 according to another embodiment of the present invention.

The battery pack 310 is different from the battery pack 110 of FIG. 4 in that thermoelectric modules 322 and 324 are also located on a second side portion of a battery module 311.

The thermoelectric modules 322 and 324 installed on the second side portion of the battery module 311 may operate when it is difficult to reduce a temperature of the second side portion of the battery module 311 using heat pipes 315*a*, 315*b*, and 315*c* only. Also, to increase a temperature of the second side portion of the battery module 311, the thermoelectric modules 322 and 324 may operate to transfer heat absorbed from outside. Methods of operating the thermoelectric modules 322 and 324 installed on the second side portion of the battery module 311 described above are exemplary and may be modified according to necessity, as is well known in the art.

In one embodiment, thermoelectric modules as described above may also be located only on the second side portion of a battery module 311. In this embodiment, a portion of a heat sink of the thermoelectric modules installed on the second side portion protrude from the housing and thus be naturally air-cooled.

The above-described battery packs 10, 110, 210, and 310 may be used in electric bicycles, but are not limited thereto. For example, battery packs may be used in electric cars. In this case, the battery packs may be modified as described above to be used in the electric cars.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A battery pack comprising:
at least one battery module comprising a plurality of unit cells stacked together;
at least one thermoelectric module on the at least one battery module, the at least one thermoelectric module comprising at least one thermoelectric device comprising a first heat transfer member contacting a first surface of the at least one thermoelectric device, and a second heat transfer member contacting a second surface of the at least one thermoelectric device generally opposite to the first surface; and
a plurality of heat pipes on the battery module and contacting the first heat transfer member and the battery module, wherein the heat pipes are accommodated in grooves on the first heat transfer member.

2. The battery pack of claim 1, comprising:
a housing generally encompassing the at least one battery module,
wherein the second heat transfer member is a heat sink at least partially protruding from the housing.

3. The battery pack of claim 1, wherein the at least one thermoelectric module comprises a Peltier device comprising an input terminal configured to receive a polarity-convertible current.

4. The battery pack of claim 3, further comprising a battery management system comprising a switching device configured to convert a polarity of a current applied to an electrode of the Peltier device.

5. The battery pack of claim 3, wherein the at least one thermoelectric module further comprises a temperature sensor, and wherein the at least one thermoelectric module is configured to convert a polarity of a current applied to an electrode of the Peltier device based on a temperature measured by the temperature sensor.

6. The battery pack of claim 5, comprising a plurality of thermoelectric modules, wherein each of the thermoelectric modules is configured to operate independently.

7. The battery pack of claim 1, wherein the at least one thermoelectric module is mounted on at least a first side of the battery module.

8. The battery pack of claim 7, wherein the at least one thermoelectric module comprises at least two thermoelectric modules mounted on the battery module and extending in directions substantially perpendicular to each other.

9. The battery pack of claim 8, wherein the at least two thermoelectric modules each comprise at least one thermoelectric device including a positive input terminal and a negative input terminal, a first heat transfer member contacting a first surface of the at least one thermoelectric device, and a second heat transfer member contacting a second surface of the at least one thermoelectric device.

10. The battery pack of claim 1, wherein a first thermoelectric module of the at least one thermoelectric module is located on a first end of the unit cells and a second thermoelectric module of the at least one thermoelectric module is located on a second end of the unit cells to fix the unit cells together.

11. The battery pack of claim 1, wherein the at least one thermoelectric device further comprises a positive input terminal and a negative input terminal.

12. The battery pack of claim 1, wherein the battery pack is configured to power an electric bicycle.

13. The battery pack of claim 1, wherein the at least one thermoelectric module is mounted on the at least one battery module and configured to selectively heat or cool the at least one battery module.

14. The battery pack of claim 1, wherein the heat pipes extend along the battery module in a first direction and in a second direction substantially perpendicular to the first direction.

* * * * *